US009736887B2

(12) United States Patent
Chiu et al.

(10) Patent No.: US 9,736,887 B2
(45) Date of Patent: Aug. 15, 2017

(54) METHOD AND DEVICE FOR HEATING ELECTRONIC COMPONENT AND ELECTRONIC APPARATUS USING THE SAME

(75) Inventors: Chia-Chang Chiu, New Taipei (TW); Chun-Chi Wang, New Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 108 days.

(21) Appl. No.: 13/350,769

(22) Filed: Jan. 14, 2012

(65) Prior Publication Data

US 2013/0098891 A1    Apr. 25, 2013

Related U.S. Application Data

(60) Provisional application No. 61/550,295, filed on Oct. 21, 2011.

(51) Int. Cl.
| | | |
|---|---|---|
| *H05K 7/20* | (2006.01) | |
| *H05B 3/02* | (2006.01) | |
| *H05B 1/02* | (2006.01) | |

(52) U.S. Cl.
CPC ................................. *H05B 1/0227* (2013.01)

(58) Field of Classification Search
CPC ........................... H05B 1/0227; G06F 9/4401
USPC ....... 219/209, 210, 486, 488, 492, 494, 497, 219/507
See application file for complete search history.

(56) References Cited

U.S. PATENT DOCUMENTS

| | | | | |
|---|---|---|---|---|
| 5,922,226 A | * | 7/1999 | Mizusawa | ..................... 219/207 |
| 7,706,929 B2 | * | 4/2010 | Chiu | .............................. 700/300 |
| 7,793,117 B2 | * | 9/2010 | Smith | ............................ 713/300 |
| 8,392,032 B2 | * | 3/2013 | Yu | .................................. 700/300 |
| 2004/0228023 A1 | * | 11/2004 | Keller et al. | ..................... 360/69 |
| 2005/0286921 A1 | * | 12/2005 | Yonekawa | ........................ 399/69 |
| 2007/0272678 A1 | * | 11/2007 | Meyuchas et al. | ........... 219/494 |
| 2009/0129048 A1 | * | 5/2009 | Wang | .............................. 362/23 |
| 2009/0198387 A1 | | 8/2009 | Lin et al. | |

(Continued)

FOREIGN PATENT DOCUMENTS

| | | |
|---|---|---|
| CN | 1886709 A | 12/2006 |
| CN | 101131601 A | 2/2008 |

(Continued)

OTHER PUBLICATIONS

China Patent Office, Office Action, Patent Application Serial No. 201110339947.1, Mar. 30, 2015, China.

*Primary Examiner* — Quang D Thanh
*Assistant Examiner* — James Sims, III

(57) ABSTRACT

The invention provides a method and a device for heating an electronic component and an electronic apparatus using the method/device. A heater is disposed at the electronic component. The heating method includes following steps: driving the heater according to a duty ratio by using electrical energy of a power module. If the output voltage of the power module is greater than a first threshold, set the duty ratio as a first ratio. If the output voltage of the power module is less than a second threshold, set the duty ratio as a second ratio. If the output voltage of the power module is between the first threshold and the second threshold, adjust the duty ratio so that the difference between the output voltage of the power module and the second threshold is positively proportional to the duty ratio.

22 Claims, 7 Drawing Sheets

(56) References Cited

U.S. PATENT DOCUMENTS

| | | | |
|---|---|---|---|
| 2010/0070745 A1* | 3/2010 | Chiu | .................................. 713/2 |
| 2010/0070746 A1* | 3/2010 | Chiu | .......................... G06F 1/20 |
| | | | 713/2 |
| 2010/0250019 A1* | 9/2010 | Yu | ................................ 700/300 |

FOREIGN PATENT DOCUMENTS

| | | |
|---|---|---|
| DE | 102008043866 A1 | 5/2010 |
| DE | 102010036444 A1 | 1/2012 |

\* cited by examiner

METHOD AND DEVICE FOR HEATING ELECTRONIC COMPONENT AND ELECTRONIC APPARATUS USING THE SAME

BACKGROUND OF THE INVENTION

Field of the Invention

The invention generally relates to an electronic apparatus, and more particularly, to a method and a device both for heating an electronic component in a low-temperature environment.

Description of Related Art

For a general mobile device, for example, a notebook computer, the normal working range thereof is room temperatures between 0° C.-45° C. Within the temperature range, the battery of a mobile device can normally output voltages to the mobile device. Also, the electronic components, for example a hard disk, inside the mobile device can operate normally within the room temperature range.

However, when a mobile device is used in a harsh environment, for example, in an environment of −30° C., the components inside the mobile device need to be heated so that the mobile device can work properly. If no external power is available on hand, it is necessary to use the battery power of the mobile device to heat the components inside the mobile device. But the battery in a low-temperature environment may not provide the power effectively. If the battery is hastily used to heat the mobile device directly, the battery in the low-temperature environment may get harm. In the above-mentioned low-temperature weather, therefore, the user faces a dilemma of heating the mobile device and preventing the low-temperature battery from getting harm.

SUMMARY OF THE INVENTION

Accordingly, the invention is directed to a method for heating an electronic component, by which the electronic component can be effectively heated without damaging a power module.

The invention is also directed to a heating device of electronic components in a low-temperature environment. The heating device can effectively heat the electronic components without damaging a power module.

The invention is further directed to an electronic apparatus, which can effectively heat the electronic components within the electronic apparatus in a low-temperature environment without damaging a power module.

The invention provides a method for heating an electronic component, in which a first heater is disposed at the electronic component. The heating method includes following steps: drive the first heater according to a duty ratio to use electrical energy of a power module; if an output voltage of the power module is greater than a first threshold, set the duty ratio as a first ratio; and if the output voltage of the power module is less than a second threshold, set the duty ratio as a second ratio. The second threshold is less than the first threshold and greater than zero. The second ratio is less than the first ratio. In addition, if the output voltage of the power module is between the first threshold and the second threshold, adjust the duty ratio so that the difference between the output voltage of the power module and the second threshold is positively proportional to the duty ratio.

In an embodiment of the present invention, the above-mentioned first ratio is 100% and the second ratio is 0%.

In an embodiment of the present invention, in the above-mentioned step of adjusting the duty ratio, the duty ratio is between the first ratio and the second ratio.

In an embodiment of the present invention, the above-mentioned step of adjusting the duty ratio includes the following step: set the duty ratio as $(DH-DL) \times [(V-VL)/(VH-VL)]$. DH is a positive number less than or equal to 1, DL is a positive number less than DH, V is the output voltage of the power module, VH is the first threshold and VL is the second threshold.

In an embodiment of the present invention, the above-mentioned first ratio and DH are 75%, the second ratio is 0%, DL is 10%, the first threshold is 8.1 and the second threshold is 7.1.

In an embodiment of the present invention, the above-mentioned method for heating an electronic component in a low-temperature environment further includes the following steps: disposing a second heater at a second electronic component, and using electrical energy of the power module to drive the second heater according to the duty ratio. The enabling duration of the first heater does not overlap with the enabling duration of the second heater.

In an embodiment of the present invention, the duty cycle of the above-mentioned duty ratio is evenly distributed to the first heater and the second heater.

In an embodiment of the present invention, when the temperature of the first electronic component reaches a normal operation temperature, the duty cycle of the duty ratio is entirely distributed to the second heater.

In an embodiment of the present invention, the above-mentioned method for heating an electronic component in a low-temperature environment further includes the following steps: disposing a second heater at a second electronic component, and using electrical energy of the power module to drive the second heater according to the duty ratio. The enabling duration of the first heater overlaps with the enabling duration of the second heater. In addition, the total time of the enabling duration of the first heater and the enabling duration of the second heater is not greater than the duty cycle of the duty ratio.

In an embodiment of the present invention, the above-mentioned method for heating an electronic component in a low-temperature environment further includes the following steps: first, detect the temperature of the first electronic component. Next, when the temperature of the first electronic component reaches a normal operation temperature, stop driving the first heater. Third, when the temperature of the first electronic component reaches a normal operation temperature, activate the first electronic component.

In an embodiment of the present invention, the above-mentioned first electronic component is a hard disk drive.

In an embodiment of the present invention, the above-mentioned power module is a battery module or an AC adapter.

The invention also provides a device for heating an electronic component in a low-temperature environment. The device includes a first heater, a power module and a controller. The first heater is disposed at a first electronic component. The power module is configured for providing the first heater with required electrical energy. The controller is coupled to the first heater and the power module. The controller controls the first heater to use the electrical energy of the power module to heat the first electronic component according to a duty ratio. If the output voltage of the power module is greater than a first threshold, the controller sets the duty ratio as a first ratio. If the output voltage of the power module is less than a second threshold, the controller sets the duty ratio as a second ratio. In addition, the second threshold is less than the first threshold and greater than zero, and the second ratio is less than the first ratio. If the output voltage of the power module is between the first threshold and the second threshold, the controller adjusts the duty ratio so that the difference between the output voltage of the power module and the second threshold is positively proportional to the duty ratio.

In an embodiment of the present invention, in the above-mentioned device for heating an electronic component in a low-temperature environment, if the output voltage of the power module is between the first threshold and the second threshold, the controller adjusts the duty ratio to be between the first ratio and the second ratio.

In an embodiment of the present invention, the above-mentioned controller sets the duty ratio as $(DH-DL) \times [(V-VL)/(VH-VL)]$. DH is a positive number less than or equal to 1, DL is a positive number less than DH, V is the output voltage of the power module, VH is the first threshold and VL is the second threshold.

In an embodiment of the present invention, the above-mentioned device for heating an electronic component in a low-temperature environment further includes a temperature sensor, which is disposed at the first electronic component to detect the temperature of the first electronic component. The temperature sensor is coupled to the controller. When the temperature of the first electronic component reaches a normal operation temperature, the controller controls the first heater to stop heating.

The invention further provides an electronic apparatus, which includes a first electronic component, a first heater, a power module and a controller. The first heater is disposed at the first electronic component. The power module is configured for providing the electronic apparatus and the first heater with required electrical energy. The controller is coupled to the first heater and the power module, and the controller controls the first heater to use the electrical energy of the power module to heat the first electronic component according to a duty ratio. If the output voltage of the power module is greater than a first threshold, the controller sets the duty ratio as a first ratio. If the output voltage of the power module is less than a second threshold, the controller sets the duty ratio as a second ratio. In addition, the second threshold is less than the first threshold and greater than zero, and the second ratio is less than the first ratio. If the output voltage of the power module is between the first threshold and the second threshold, the controller adjusts the duty ratio so that the difference between the output voltage of the power module and the second threshold is positively proportional to the duty ratio.

In an embodiment of the present invention, in the above-mentioned electronic apparatus, if the output voltage of the power module is between the first threshold and the second threshold, the controller adjusts the duty ratio to be between the first ratio and the second ratio.

In an embodiment of the present invention, the above-mentioned controller sets the duty ratio as $(DH-DL) \times [(V-VL)/(VH-VL)]$. DH is a positive number less than or equal to 1, DL is a positive number less than DH, V is the output voltage of the power module, VH is the first threshold and VL is the second threshold.

In an embodiment of the present invention, the above-mentioned electronic apparatus further includes a temperature sensor, which is disposed at the first electronic component to detect the temperature of the first electronic component. The temperature sensor is coupled to the controller. When the temperature of the first electronic component reaches a normal operation temperature, the controller controls the first heater to stop heating.

Based on the above description, the invention provides a method for heating an electronic component in a low-temperature environment. The method provides to obtain a duty ratio according to the output voltage of the power module so as to heat the electronic component according to the duty ratio. As a result, the electronic component can be heated to a normal operation temperature without damaging the power module. An example of the power module is a battery. The invention also provides a device for heating an electronic component in a low-temperature environment. The device uses the above-mentioned method to heat the electronic component. The invention further provides an electronic apparatus, which includes the above-mentioned heating device. The electronic apparatus is suitable for a low-temperature environment.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1:
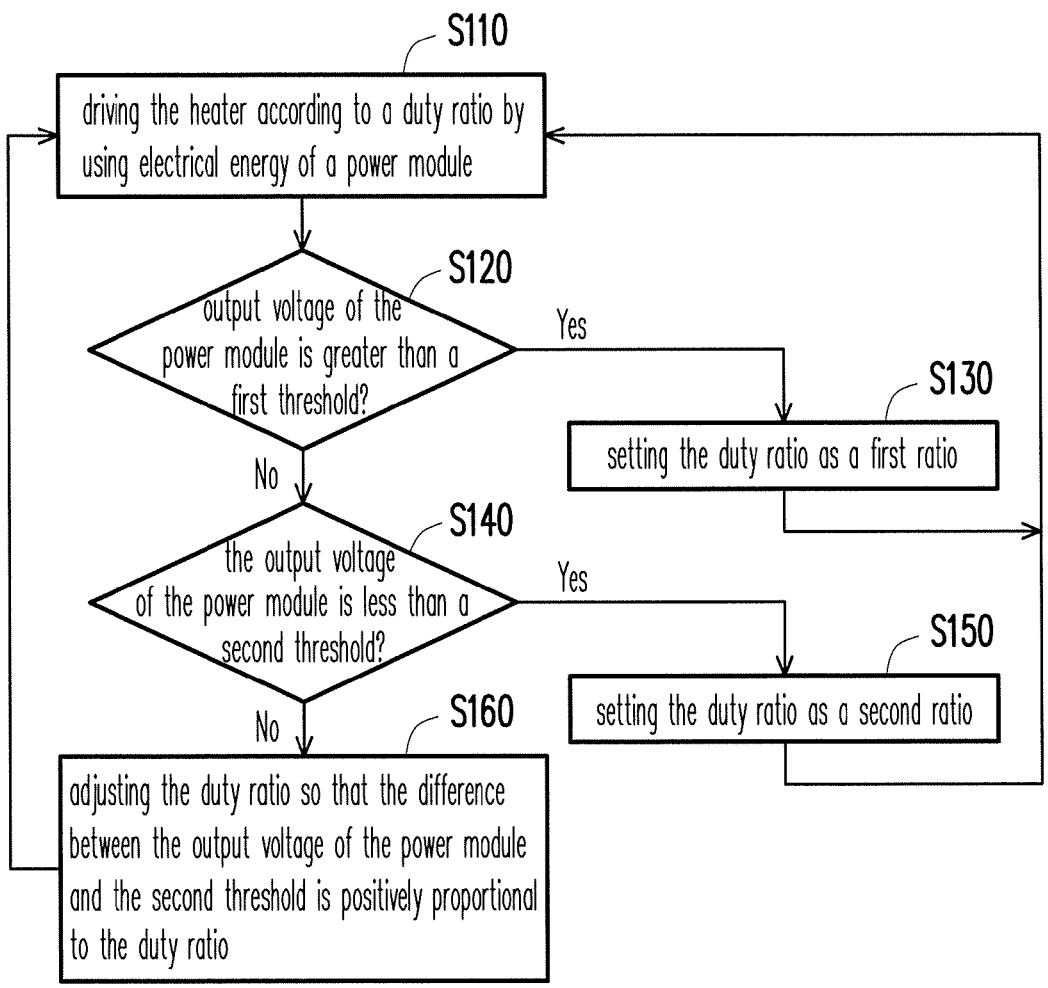
FIG. 1 is a flowchart of a method for heating an electronic component in a low-temperature environment according to an embodiment of the invention.
Figure 2:
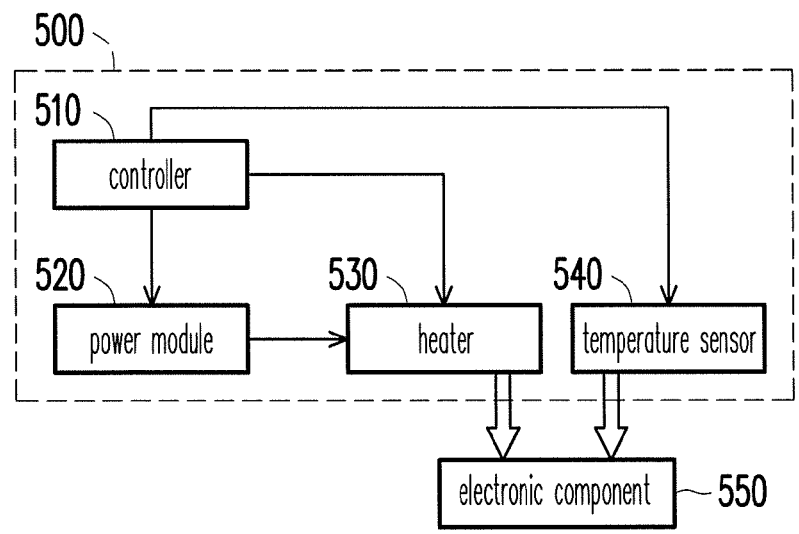
FIG. 2 is a schematic diagram of a device for heating an electronic component in a low-temperature environment according to an embodiment of the invention.

FIG. 1 is a flowchart of a method for heating an electronic component in a low-temperature environment according to an embodiment of the invention and FIG. 2 is a schematic function block diagram of a device for heating an electronic apparatus in a low-temperature environment. The electronic apparatus includes a heating device 500 and an electronic component 550. The heating device 500 is able to preheat the electronic component 550 during the boot sequence in a low-temperature environment. After the temperature of the electronic component 550 climbs an allowable temperature, the electronic apparatus can complete the boot sequence successfully.

In a low-temperature environment, in order to boot and operate the electronic apparatus of FIG. 2, the electronic component 550 inside the electronic apparatus must be heated so the temperature of the electronic component climbs a normal operation temperature in advance. As a result, a user can operate the electronic apparatus normally. For example, in order to boot and operate a notebook computer in an environment of −30° C., the hard disk drive inside the notebook computer must be preheated so the temperature of the hard disk drive climbs to 0° C., then the user can operate the notebook computer normally.

In this embodiment, the heating device 500 includes a controller 510 (for example, an embedded controller), a power module 520 and a heater 530. The heater 530 is disposed at the electronic component 550 (for example, a hard disk drive). The controller 510 is coupled to the heater 530 and the power module 520. The built-in power module 520 (for example, a battery module or an AC adapter) of the electronic apparatus provides the electrical energy the heater 530 requires. The controller 510 determines/adjusts a duty ratio and drives the heater 530 disposed at the electronic component 550 according to the duty ratio, so as to control the heater 530 to use the electrical energy of the power module 520 to heat the electronic component 550 inside the electronic apparatus. When the power module 520 is a battery module, the output voltage of the battery module at a low-temperature has a limitation. For example, the efficiency of the battery module to output voltage is lower in a low-temperature situation. Under such circumstances, if the heater 530 uses all the output electrical energy of the battery module intensively to heat the electronic component 550 in a low-temperature situation, the battery module may be damaged. Also, an over-discharge of the battery module in the low-temperature environment may trigger a self-protection action of the battery module and stop the battery module from providing power. For example, in an environment of −40° C., if the heater 530 continuously uses the electrical energy of the battery module 520 at a duty ratio of 100% to heat the electronic component 550, the battery module 520 may be damaged.

Referring to FIGS. 1 and 2, the controller 510 can access the control chip of the power module 520 through a bus to obtain the temperature and the output voltage of the power module 520. For example, the controller 510 detects the temperature and the output voltage of the power module 520 through an SM-bus (system management bus). Then the controller 510 can dynamically determine the duty ratio according to the output voltage of the power module 520 and control/drive the heater 530 according to the duty ratio (step S110). The heater 530 uses the electrical energy provided by the power module 520 according to the duty ratio to heat the electronic component 550. In order to prevent the power module 520 from being damaged, the duty ratio needs to correlate to the output voltage of the memory module 520. Therefore, the duty ratio needs to be dynamically adjusted through the following steps.

The controller 510 executes step S120 to determine whether the output voltage of the power module 520 is greater than a first threshold. If the output voltage of the power module 520 is greater than the first threshold, the controller 510 sets the duty ratio as a first ratio (step S130). If the output voltage of the power module 520 is not greater than the first threshold, the controller 510 executes step S140 to determine whether the output voltage of the power module 520 is less than a second threshold, which is less than the first threshold and greater than zero. If the output voltage of the power module 520 is less than the second threshold, the controller 510 sets the duty ratio as a second ratio (step S150). The second ratio is less than the first ratio. The first ratio and the second ratio are determined depending on the actual product design requirement. For example, the first ratio is 100%, while the second ratio is 0%.

The purpose of the steps from S120 to S150 is determining whether the output voltage of the power module 520 is within a preset interval. If the output voltage of the power module 520 is above the preset interval, the duty ratio is set to the first ratio. If the output voltage of the power module 520 is below the preset interval, the duty ratio is set to the second ratio. If the output voltage of the power module 520 is within the preset interval, the workflow executes step S160. For example, if the output voltage of the power module 520 is between the first threshold and the second threshold, the controller 510 dynamically adjusts the duty ratio according to the output voltage of the power module 520 so that the difference between the output voltage of the power module 520 and the second threshold is positively proportional to the duty ratio (step S160). That is, if the output voltage of the power module 520 is between the two thresholds, the duty ratio is obtained by conversion to the difference between the output voltage of the power module 520 and the second threshold. After obtaining the new duty ratio, use the new duty ratio to execute step S110, and to drive the heater 530.

For example, in the step S160, the controller 510 may adjust the duty ratio to be in the interval of the first ratio and the second ratio. For example, the duty ratio is set as $(DH-DL) \times [(V-VL)/(VH-VL)]$. DH is a positive number less than 1, DL is a positive number less than DH, V is the output voltage of the power module 520, VH is the first threshold and VL is the second threshold.

For example, assuming the output voltage of the power module 520 at the normal operation temperature is 8.1V, so the first threshold VH in step S120 is set as 8.1V (step S120). In addition, assuming the low-voltage self-protection point of the battery controller in the power module 520 is set as 6.6V, that is, when the output voltage of the power module 520 is lower than 6.6V, the battery inside the power module 520 may be damaged. Therefore, the second threshold VL in step S120 can be set as any value greater than 6.6V but less than the first threshold VH (8.1V). For example, the second threshold VL in step S140 can be conservatively set as 7.1V. Moreover, in order to avoid the power module 520 from outputting at 100% duty ratio and consuming the electrical capacity too rapidly, the first ratio in step S130 can be set as 75% and the second ratio in step S150 is set as 0%. At the same time, the DH value and DL value in step S160 can be defined according to the actual product design requirement. For example, DH is 75% and DL is 10%.

Figure 3:
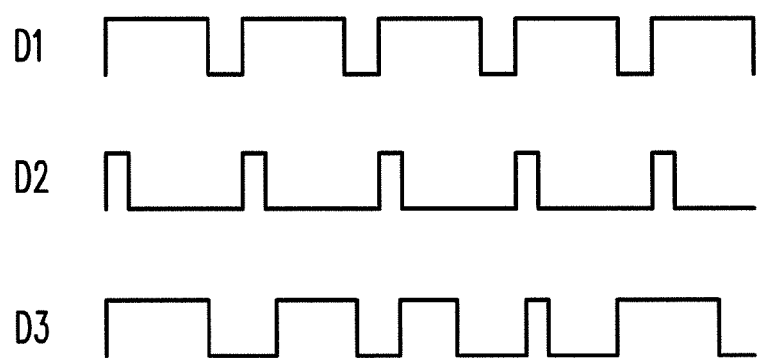
FIG. 3 is a waveform diagram of duty cycles of different duty ratios according to an embodiment of the invention.

In an actual example illustrated in FIG. 3, FIG. 3 is a waveform diagram of duty cycles of different duty ratios according to an embodiment of the invention. If the output voltage of the power module 520 is above the first threshold (for example, over 8.1V), the duty ratio of the control signal for the controller 510 to drive the heater 530 is fixed at the first ratio (for example, 75%, as shown by waveform D1). Accordingly, the controller 510 operates/drives the heater 530 at a fixed duty ratio of 75%. If the output voltage of the power module 520 is less than the second threshold (for example, less than 7.1V), the duty ratio of the control signal for the controller 510 to drive the heater 530 is fixed at the second ratio (for example, 10%, as shown by waveform D2). Accordingly, the controller 510 operates/drives the heater 530 at a fixed duty ratio of 10%. If the output voltage of the power module 520 is between the first threshold and the second threshold (for example, between 7.1V and 8.1V), the control signal for the controller 510 to drive the heater 530 is shown by waveform D3. That is, the controller 510 operates/drives the heater 530 at different duty ratios according to the different output voltages.

In another embodiment, the controller 510 sets the duty ratio as (DH−DL)×[(V−VL)/(VH−VL)]+DL. By adjusting the work ratio according to step S610, when the output voltage of the battery module 520 is between the first threshold and the second threshold, the resulting work ratio may be limited between DL and DH.

Figure 4:
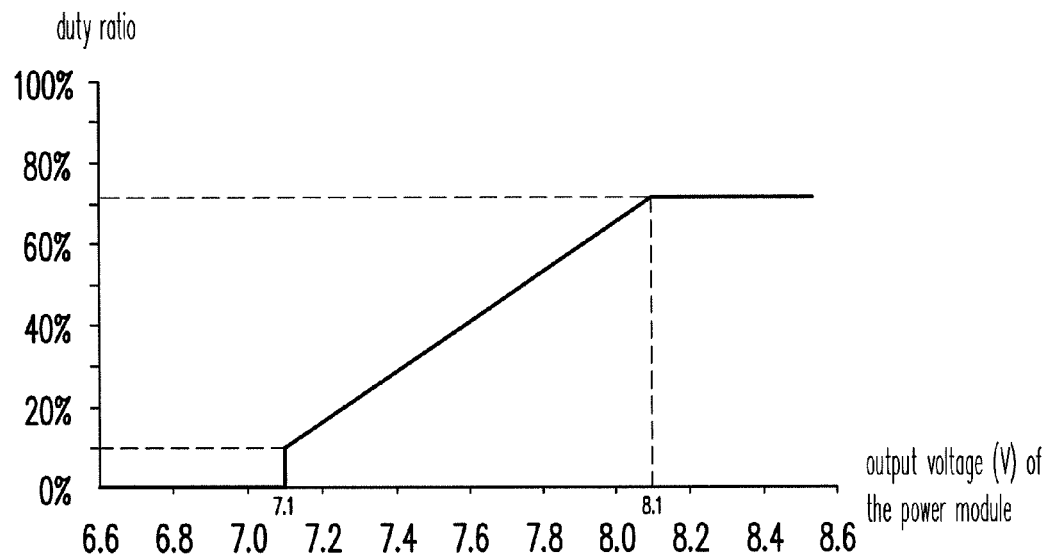
FIG. 4 is a schematic graphic diagram showing the relationship between the output voltage of the power module and the duty ratio according to an embodiment of the invention.

FIG. 4 is a schematic graphic diagram showing the relationship between the output voltage of the power module 520 and the duty ratio of the heater 530 according to an embodiment of the invention. Referring to FIG. 4, in step S130 of the embodiment, the first ratio is 75%, the second ratio in step S150 is 0%, DH in step S160 is 75%, DL in step S160 is 10%, the first threshold VH in step S120 is 8.1 and the second threshold VL in step S140 is 7.1. By executing the above-mentioned duty ratio equation (DH−DL)×[(V−VL)/(VH−VL)]+DL in step S160, the relationship figure of the output voltage V and the duty ratio as in FIG. 4 can be obtained. As shown in FIG. 4, when the output voltage V of the power module 520 is greater than the first threshold (V>8.1V), the duty ratio of the heater 530 is fixed at the first ratio of 75%. When the output voltage V of the power module 520 is less than the second threshold (V<7.1V), the duty ratio of the heater 530 is fixed at the second ratio of 0%. When the output voltage V of the power module 520 is between the first threshold and the second threshold (V=7.1V−8.1V), the output voltage V of the power module 520 is in linear relationship with the duty ratio of the heater 530.

In actual practice, the controller 510 can operate the heater 530 by means of using the duty ratio in combination with the pulse width modulation (PWM). It should be noted that, in a low-temperature environment, for example, lower than −30° C., the output of the internal battery of the power module 520 is closer to the second threshold VL. Accordingly, the controller 510 will lower the duty ratio of the heater 530 to protect the power module 520. However, the internal battery of the power module 520 releases heat during its discharging process, and the battery temperature would be gradually increased. While the battery temperature of the power module 520 is slowly increased, the discharging efficiency of such internal battery may get improved gradually. That is, the output voltage of the internal battery of the power module 520 may gradually increase. During the process, if the controller 510 continuously detects the output voltage of the internal battery of the power module 520 and thereby dynamically adjusts the duty ratio of the heater 530, the duty ratio of the heater 530 would be raised along with the trend of the battery output voltage according to the above-mentioned steps.

Figure 5:
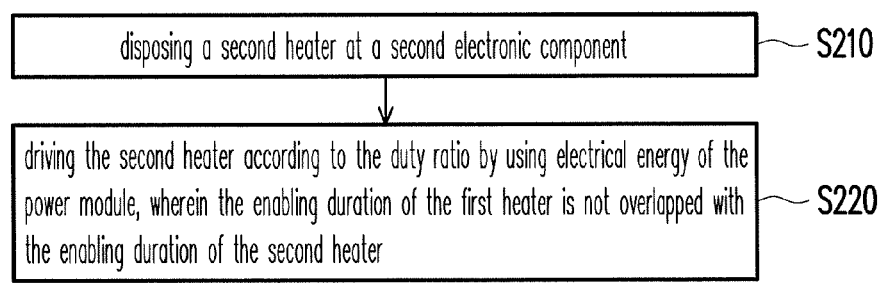
FIG. 5 is a flowchart of a method for heating two electronic components in a low-temperature environment according to an embodiment of the invention.

In an embodiment of the invention, for an apparatus having a first electronic component and a second electronic component to operate in a low-temperature environment, a first heater and a second heater are used to respectively heat the first electronic component (for example, a first hard disk drive) and the second electronic component (for example, a second hard disk drive), according to the following steps. FIG. 5 is a flowchart of a method for heating two electronic components in a low-temperature environment according to an embodiment of the invention. The descriptions of FIGS. 1-4 can be analogically applied to the embodiment. Referring to FIG. 5, the first heater is disposed at the first electronic component and the second heater is disposed at the second electronic component (step S210). The controller can obtain the duty ratios according to the method of the embodiments in FIGS. 1-4. The controller respectively drives the first heater and the second heater according to the duty ratios. The driven first heater and second heater can use the electrical energy of the power module to respectively heat the first electronic component and the second electronic component. The enabling duration of the first heater does not overlap with the enabling duration of the second heater (step S220).

In step S220 of the above-mentioned embodiment, since the electronic apparatus can't be normally activated unless the first electronic component and the second electronic component are heated to a normal operation temperature, for example, 0° C., the controller needs to heat the two electronic components alternately to improve the efficiency of the heaters. Accordingly, the enabling duration of the first heater does not overlap with the enabling duration of the second heater. That is, when heating the first electronic component, the second electronic component is not heated, and vice versa.

Figure 6:
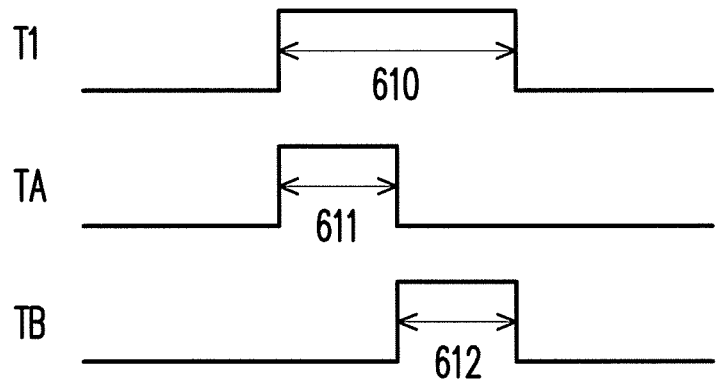
FIG. 6 is a waveform diagram of the enabling durations of a first heater and a second heater according to an embodiment of the invention.

In order to avoid the enabling duration of the first heater and the enabling duration of the second heater from overlapping with each other, the duty cycle of the duty ratio is evenly distributed to the first heater and the second heater. FIG. 6 is a waveform diagram of the enabling durations of the first heater and the second heater according to an embodiment of the invention. Referring to FIG. 6, a waveform T1 is a duty ratio obtained by the controller's execution of the steps of FIG. 1, in which the duty ratio has a duty cycle 610. By evenly distributing the duty cycle 610 of the waveform T1, the controller can respectively produce two control signals TA and TB to the first heater and the second heater so the enabling durations of different heaters will not overlap. The duty cycle 611 of the control signal TA is the enabling duration of the first heater and the duty cycle 612 of the control signal TB is the enabling duration of the second heater. The above-mentioned duty cycle 610 is greater than or equal to the sum of the duty cycle 611 and the duty cycle 612.

When the temperature of the first power module has reached the normal operation temperature but the temperature of the second power module has not reached the normal operation temperature, the controller can entirely assign the duty cycle 610 of the duty ratio to the second heater. That is, the duty cycle 611 is reduced to zero, while the duty cycle 612 is increased to be equal to the duty cycle 610. On the contrary, when the temperature of the second power module has reached the normal operation temperature but the temperature of the first power module has not reached the normal operation temperature, the controller can entirely assign the duty cycle 610 of the duty ratio to the first heater. That is, the duty cycle 612 is reduced to zero, while the duty cycle 611 is increased to be equal to the duty cycle 610.

Figure 7:
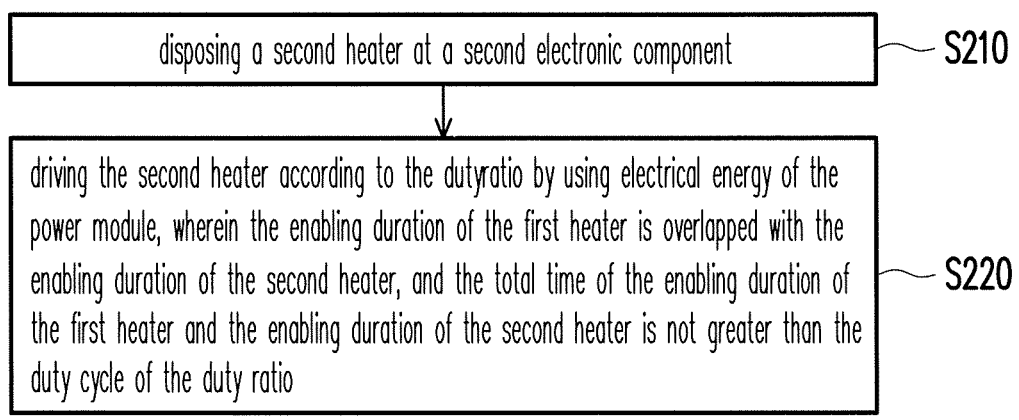
FIG. 7 is a flowchart of a method for heating two electronic components in a low-temperature environment according to an embodiment of the invention.

FIG. 7 is a flowchart of a method for heating two electronic components in a low-temperature environment according to an embodiment of the invention. Referring to FIG. 7, the relevant descriptions in FIG. 5 can be used to explain the present embodiment, except for one difference. In step S220 of the present embodiment, the enabling durations of the first heater and the second heater may overlap, and the sum of the enabling durations of the first heater and the second heater is not greater than the duty cycle of the duty ratio.

Figure 8:
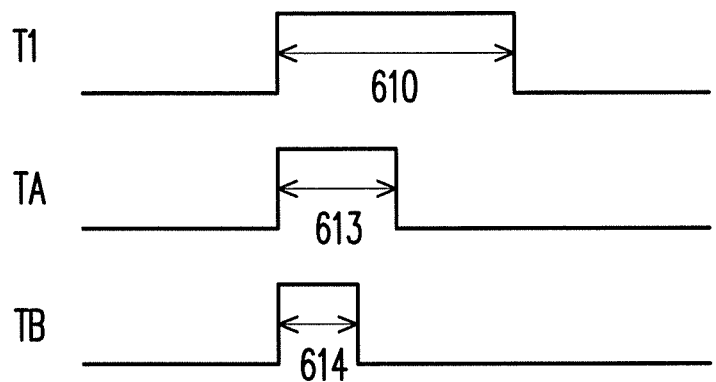
FIG. 8 is another waveform diagram of duty cycles of enabling durations of a first heater and a second heater according to an embodiment of the invention.

FIG. 8 is another waveform diagram of the enabling durations of a first heater and a second heater according to an embodiment of the invention. Referring to FIG. 8, a waveform T1 has a duty ratio obtained by the controller's execution of the steps FIG. 1, in which the duty ratio has a duty cycle 610. A waveform TA is the control signal outputted from the controller to the first heater, in which the control signal TA has a duty cycle 613 (enabling duration). A waveform TB is the control signal outputted from the controller to the second heater, in which the control signal TB has a duty cycle 614 (enabling duration). As shown in FIG. 8, the duty cycle 613 overlaps with the duty cycle 614, and the sum of duty cycle 613 and the duty cycle 614 is not greater than the duty cycle 610. That is, both the first heater and the second heater can be operated simultaneously to respectively heat the first electronic component and the second electronic component, but the sum of the enabling durations of the first heater and the second heater is not greater than the duty cycle 610.

If the number of the electronic components to be heated is more than two, the duty cycle 610 of the duty ratio of the output voltage of the power module can be divided and assigned to each of the heaters based on the number thereof. Therefore, the number of the electronic components to be heated is not limited herein.

Figure 9:
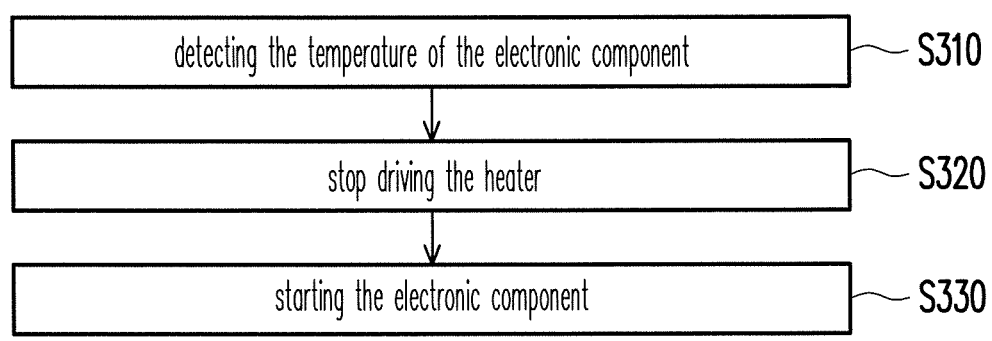
FIG. 9 is a flowchart for heating an electronic component to an operation temperature according to an embodiment of the invention.

In addition to the duty ratio, for some embodiments, the method for heating an electronic component must consider whether the electronic component 550 has reached the normal operation temperature. FIG. 9 is a flowchart for heating an electronic component to an operation temperature according to an embodiment of the invention. In the embodiment, the heating device 500 further includes a temperature sensor 540. As shown in FIG. 2, the temperature sensor 540 is disposed at the electronic component 550 and can be coupled to the controller 510 through a bus. For example, the controller 510 can read the sensed value of the temperature sensor 540 through an SM-bus. Referring to FIGS. 2 and 9, the controller 510 can detect the temperature of the electronic component 550 (for example, a hard disk drive) through the temperature sensor 540 (step S310). When the temperature of the electronic component 550 reaches the normal operation temperature, the controller 510 stops driving the heater 530 (step S320), and activates the electronic component 550 (step S330). Through the three steps mentioned above, when starting the electronic component in a low-temperature situation, it is assured that the electronic component inside the apparatus has reached the operational temperature. Therefore, the electronic component 550 can be heated without damaging the power module 520. When the temperature of the electronic component 550 reaches the normal operation temperature, the controller 510 controls the heater 530 to stop heating the electronic component 550.

Figure 10:
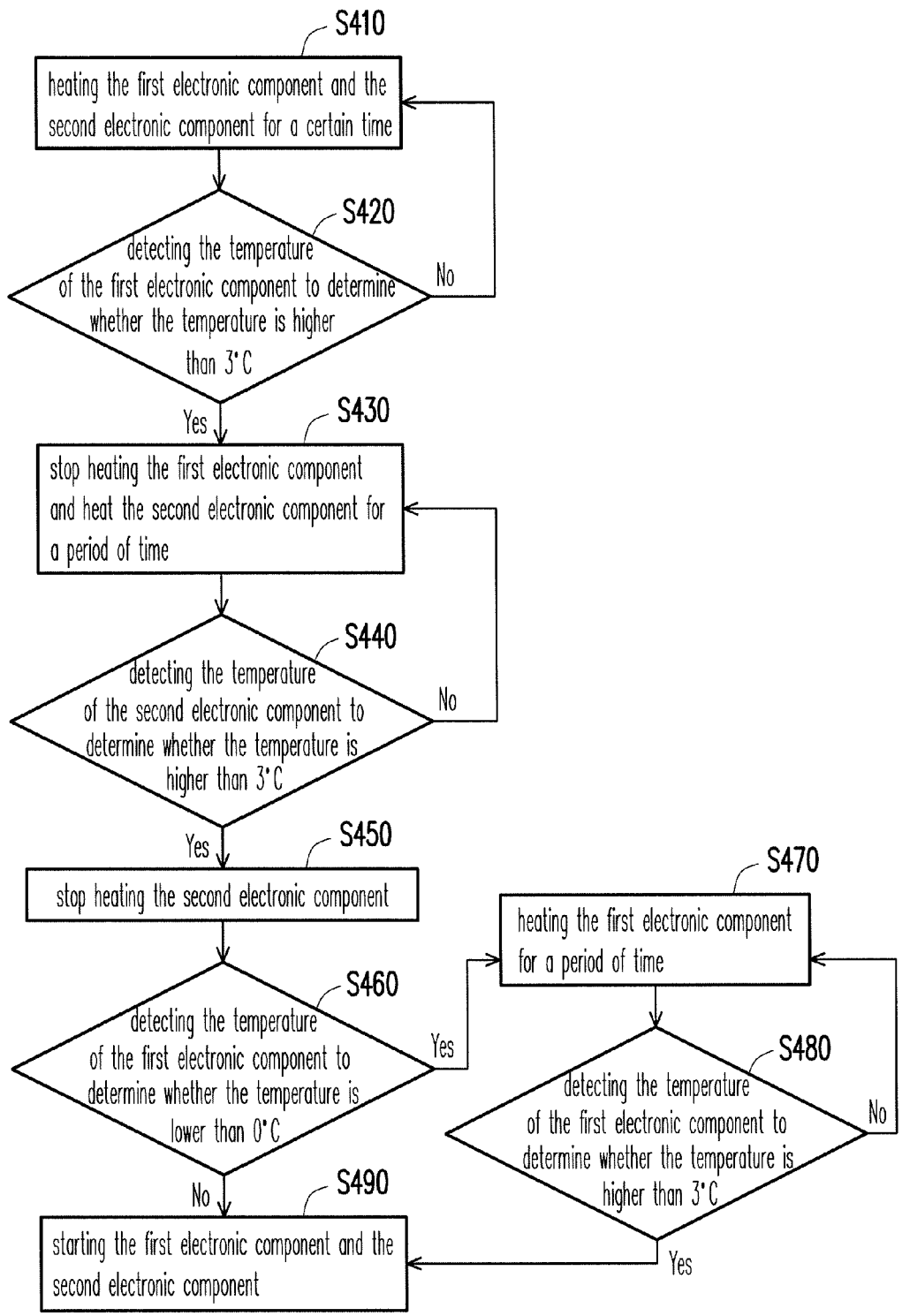
FIG. 10 is a flowchart for heating two electronic components to an operation temperature according to an embodiment of the invention.

FIG. 10 is a flowchart illustrating a method for heating two electronic components to an operation temperature according to an embodiment of the invention. Referring to FIG. 10, first, under a low-temperature, the controller controls the first heater and the second heater to respectively heat the first electronic component and the second electronic component for a certain time (step S410). Next, detecting the temperature of the first electronic component to determine whether the temperature is higher than 3° C. (step S420). If the temperature of the first electronic component is not higher than 3° C., return to step S410 and continue heating the first electronic component and the second electronic component for a period of time. If the temperature of the first electronic component is higher than 3° C., stop heating the first electronic component and heat the second electronic component for a period of time (step S430).

Then, detect the temperature of the second power module to determine whether the temperature is higher than 3° C. (step S440). If the temperature of the second electronic component is not higher than 3° C., return to step S430 to continue heating the second electronic component for a period of time. If the temperature of the second electronic component is higher than 3° C., stop heating the second electronic component (step S450). In addition, in order to ensure the temperature of the first electronic component remains at the operational temperature, the controller performs step S460 to detect the temperature of the first power module to determine whether the temperature is lower than 0° C. If the temperature of the first electronic component is higher than 0° C., the first electronic component and the second electronic component will be activated (step S490). If the temperature of the first electronic component is lower than 0° C., heat the first electronic component for a period of time (step S470). After step S470, the temperature of the first electronic component is detected again to determine whether the temperature is higher than 3° C. (step S480). If the temperature is not higher than 3° C., return to step S470 to continue heating the first electronic component for a period of time. Otherwise, perform step S490 to finish activating the first electronic component and the second electronic component.

By applying the heating method to the above-mentioned embodiment, it is ensured that the two electronic components activate when both of the electronic components are heated to the normal operation temperature. It should be noted that the upper-limit temperature for judging whether heating is sufficient is 3° C., and the lower-limit temperature for judging whether heating is insufficient is 0° C. That is, the upper-limit temperature for determining heating completion is raised to 3° C., which is higher than the lower-limit temperature, to provide a buffer range. The purpose of providing such buffer range is to prevent a situation in which the temperature of electronic component drops below the lower-limit temperature immediately while the component waits for another electronic component to be heated, after another electronic component has finished being heated. However, the upper-limit temperature for determining heating completion and the lower-limit temperature depends on the actual situation. In addition, in the present invention, the upper-limit temperature for determining heating completion is not limited to 3° C. and the lower-limit temperature is not limited to 0° C.

In general, in a mobile device system, for example, a notebook computer or a tablet computer, if the temperature of the power module is too low (for example, in −17° C.), the power providing efficiency of the power module is insufficient to drive the heater of a hard disk drive. Still, the power module in a low-temperature situation is capable of providing sufficient power to other system components, for example, a CPU (central processing unit). Only after the system components, such as the CPU, receive power, the system components can generate thermal energy to heat the interior of the electronic apparatus. Therefore, the present embodiment uses such system components to perform pre-heat process. During the preheating process, in addition to heat provided by the system components, heat is also generated by the battery due to its discharge. Such heat raises the battery temperature, that is, the heat improves the electric power provision efficiency of the power module. If the temperature of the power module is higher than, for example, −17° C., the electric power provision efficiency of the power module is usually sufficient to drive the heater of a hard disk drive. As a result, the electric power of the power module can be used directly to heat the hard disk drive (electronic component). It should be noted that the above-mentioned −17° C. is an example only, and the actual temperature must be determined according to the characteristic of the battery.

Figure 11:
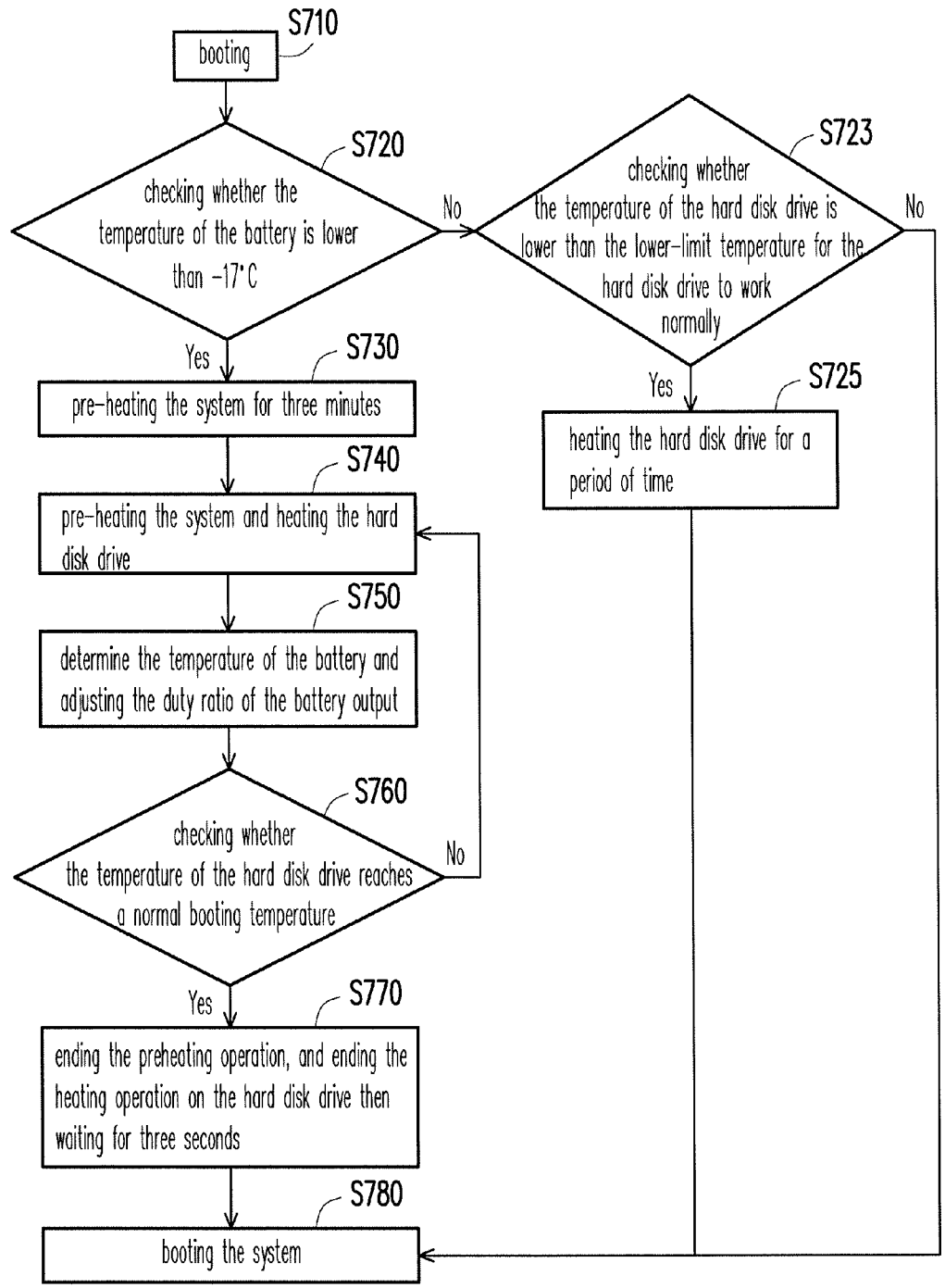
FIG. 11 is a flowchart of a method for heating an electronic apparatus according to an embodiment of the invention.

FIG. 11 is a flowchart of a method for heating an electronic apparatus according to an embodiment of the invention. Referring to FIG. 11, first, a user starts booting (step S710). In the meantime, the controller checks whether the battery temperature (power module) is lower than −17° C. (step S720). If the battery temperature is higher than −17° C., the controller checks whether the temperature of the hard disk drive is lower than the lower-limit temperature for the hard disk drive to work normally (step S723). The lower-limit temperature for the hard disk drive to work normally usually is 0° C. in step S723. If, in step S723, the temperature of the hard disk drive is determined to be lower than the normal work temperature, perform step S725 to heat the hard disk drive for a period of time (for example, several minutes). Then, a regular booting procedure can be performed (step S780). Examples of the regular booting procedure include power on self test (POST) and loading the operating system (OS). In addition, if in step S723, the temperature of the hard disk drive is determined to be higher than the lower-limit of the normal work temperature, directly perform step S780 to run the regular booting procedure.

In step S720, If the battery temperature is determined to be lower than −17° C., the system components (for example, the CPU) are first preheated for a period of time (for example, three minutes) (step S730). In this embodiment, step S730 can use the heating method as shown in FIG. 1. That is, the system components are driven to preheat the system/battery by using the method of dynamically adjusting the duty ratio according to the output voltage of the battery.

In addition to continuously providing power to the system components for preheating, the battery (power module) also provides electrical power to the heater to heat the hard disk drive for a period of time (step S740). Then, step S750 is performed to determine the battery temperature and dynamically adjust the duty ratio of the output voltage of the power module. In the embodiment, steps S740 or S750 can use the heating method as shown in FIG. 1. That is, the heater is driven to preheat the hard disk drive, and/or the system components are driven to pre-heat the system/battery, by using the method of dynamically adjusting the duty ratio according to the output voltage of the battery.

Moreover, the controller checks whether the temperature of the hard disk drive reaches a normal booting temperature (step S760). If the temperature of the hard disk drive is not higher than the lower-limit temperature of the normal booting temperature, the return to step S740 to continue preheating the system and heating the hard disk drive. On the contrary, if the temperature of the hard disk drive is higher than the lower-limit temperature of the normal booting temperature, stop preheating the system, stop heating the hard disk drive, and pause for a period of time (e.g., three seconds) (step S770), to avoid a sudden overtension. Accordingly, the regular booting procedure can be started (step S780).

In summary, the invention provides a method for heating an electronic component in a low-temperature environment. By using the method, a duty ratio is obtained according to the output voltage of the power module so as to produce a corresponding duty cycle according to the duty ratio and thereby to heat the electronic component to reach a normal operation temperature. In this way, the electronic component can be operated in a low-temperature environment. Further, the duty cycle of the duty ratio can be distributed to different electronic components to improve the usage efficiency of the heater. The invention also provides a device for heating an electronic component in a low-temperature environment. The device uses the above-mentioned method for heating an electronic component to heat at least one electronic component. The invention further provides an electronic apparatus, which includes the above-mentioned heating device and is suitable for a low-temperature environment. In particular, the heating device can heat the system components in a specific low-temperature environment.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. A device for heating an electronic component in a low-temperature environment, comprising:
   a first heater, disposed at a first electronic component;
   a power module, configured for providing the first heater with required electrical energy; and
   a controller, coupled to the first heater and the power module, wherein the controller is programmed to detect an output voltage and a temperature of the power module and, when the temperature is below a predetermined threshold, dynamically control the first heater to use the electrical energy of the power module to heat the first electronic component according to a duty ratio set according to the detected output voltage of the power module as follows:
   when the output voltage of the power module is greater than a first threshold voltage, the controller is programmed to set the duty ratio as a first ratio;
   when the output voltage of the power module is less than a second threshold voltage, the controller is programmed to set the duty ratio as a second ratio, wherein the second threshold voltage is less than the first threshold voltage and greater than zero, and the second ratio is less than the first ratio; and
   when the output voltage of the power module is between the first threshold voltage and the second threshold voltage, the controller is programmed to adjust the duty ratio by conversion to a difference between the output voltage of the power module and the second threshold so that the difference between the output voltage of the power module and the second threshold voltage is positively proportional to the duty ratio.

2. The device for heating the electronic component in the low-temperature environment as claimed in claim 1, wherein the controller is programmed to adjust the duty ratio to be between the first ratio and the second ratio when the output voltage of the power module is between the first threshold voltage and the second threshold voltage.

3. The device for heating the electronic component in the low-temperature environment as claimed in claim 1, wherein, when the output voltage of the power module is between the first threshold voltage and the second threshold voltage, the controller is programmed to set the duty ratio as (DH−DL)×[(V−VL)/(VH−VL)], wherein DH is a positive number less than or equal to 1, DL is a positive number less than DH, V is the output voltage of the power module, VH is the first threshold voltage and VL is the second threshold voltage.

4. The device for heating the electronic component in the low-temperature environment as claimed in claim 1, further comprising:
a temperature sensor, disposed at the first electronic component to detect a temperature of the first electronic component, wherein the temperature sensor is coupled to the controller;
wherein the controller is programmed to control the first heater to stop heating when the temperature of the first electronic component reaches a normal operation temperature.

5. The device for heating an electronic component in a low-temperature environment as claimed in claim 1, wherein the controller is an embedded controller.

6. A method for heating an electronic component in a low-temperature environment using the device of claim 1, the method comprising:
detecting an output voltage and a temperature of the power module and, when the temperature is below the predetermined threshold, driving the first heater according to the duty ratio to use electrical energy of the power module, wherein the duty ratio is dynamically set by the controller according to the detected output voltage of the power module as follows:
when the output voltage of the power module is greater than the first threshold voltage, the controller setting the duty ratio as the first ratio;
when the output voltage of the power module is less than the second threshold voltage, the controller setting the duty ratio as the second ratio, wherein the second threshold voltage is less than the first threshold voltage and greater than zero, and the second ratio is less than the first ratio; and
when the output voltage of the power module is between the first threshold voltage and the second threshold voltage, the controller adjusting the duty ratio by conversion to a difference between the output voltage of the power module and the second threshold so that the difference between the output voltage of the power module and the second threshold voltage is positively proportional to the duty ratio.

7. The method for heating an electronic component in a low-temperature environment as claimed in claim 6, wherein the first ratio is 100% and the second ratio is 0%.

8. The method for heating the electronic component in the low-temperature environment as claimed in claim 6, wherein in the step of adjusting the duty ratio, the duty ratio is between the first ratio and the second ratio.

9. The method for heating the electronic component in the low-temperature environment as claimed in claim 6, wherein the step of adjusting the duty ratio comprises:
setting the duty ratio as (DH−DL)×[(V−VL)/(VH−VL)], wherein DH is a positive number less than or equal to 1, DL is a positive number less than DH, V is the output voltage of the power module, VH is the first threshold voltage and VL is the second threshold voltage.

10. The method for heating the electronic component in the low-temperature environment as claimed in claim 9, wherein the first ratio and DH are 75%, the second ratio is 0%, DL is 10%, the first threshold voltage VH is 8.1 and the second threshold voltage VL is 7.1.

11. The method for heating the electronic component in the low-temperature environment as claimed in claim 6, further comprising:
disposing a second heater at a second electronic component; and
driving the second heater according to the duty ratio to use electrical energy of the power module;
wherein an enabling duration of the first heater does not overlap with an enabling duration of the second heater.

12. The method for heating the electronic component in the low-temperature environment as claimed in claim 11, wherein a duty cycle of the duty ratio is evenly distributed to the first heater and the second heater.

13. The method for heating the electronic component in the low-temperature environment as claimed in claim 11, wherein the duty cycle of the duty ratio is entirely distributed to the second heater when a temperature of the first electronic component reaches a normal operation temperature.

14. The method for heating the electronic component in the low-temperature environment as claimed in claim 6, further comprising:
disposing a second heater at a second electronic component; and
enabling the second heater by using electrical energy of the power module according to the duty ratio;
wherein the enabling duration of the first heater overlaps with the enabling duration of the second heater, and the total time of the enabling duration of the first heater and the enabling duration of the second heater is not greater than the duty cycle of the duty ratio.

15. The method for heating the electronic component in the low-temperature environment as claimed in claim 6, further comprising:
detecting the temperature of the first electronic component;
when the temperature of the first electronic component reaches a normal operation temperature, stop driving the first heater; and
when the temperature of the first electronic component reaches the normal operation temperature, activating the first electronic component.

16. The method for heating the electronic component in the low-temperature environment as claimed in claim 6, wherein the first electronic component is a hard disk drive.

17. The method for heating the electronic component in the low-temperature environment as claimed in claim 6, wherein the power module is a battery module or an AC adapter.

18. An electronic apparatus, comprising:
a first electronic component;
a first heater, disposed at the first electronic component;
a power module, configured for providing the electrical energy the first electronic component and the first heater require; and
a controller, coupled to the first heater and the power module, wherein the controller is programmed to detect an output voltage and a temperature of the power module and, when the temperature is below a predetermined threshold dynamically control the first heater to use the electrical energy of the power module for heating the first electronic component according to a duty ratio set according to the detected output voltage of the power module as follows:

when the output voltage of the power module is greater than a first threshold voltage, the controller is programmed to set the duty ratio as a first ratio;

when the output voltage of the power module is less than a second threshold voltage, the controller is programmed to set the duty ratio as a second ratio, wherein the second threshold voltage is less than the first threshold voltage and greater than zero, and the second ratio is less than the first ratio; and when the output voltage of the power module is between the first threshold voltage and the second threshold voltage, the controller is programmed to adjust the duty ratio by conversion to a difference between the output voltage of the power module and the second threshold so that the difference between the output voltage of the power module and the second threshold voltage is positively proportional to the duty ratio.

19. The electronic apparatus as claimed in claim 18, wherein the controller is programmed to adjust the duty ratio to be between the first ratio and the second ratio when the output voltage currently amended the power module is between the first threshold voltage and the second threshold voltage.

20. The electronic apparatus as claimed in claim 18, wherein, when the output voltage of the power module is between the first threshold voltage and the second threshold voltage, the controller is programmed to set the duty ratio as $(DH-DL)\times[(V-VL)/(VH-VL)]$, wherein DH is a positive number less than or equal to 1, DL is a positive number less than DH, V is the output voltage of the power module, VH is the first threshold voltage and VL is the second threshold voltage.

21. The electronic apparatus as claimed in claim 18, further comprising:

a temperature sensor, disposed at the first electronic component to detect a temperature of the first electronic component, wherein the temperature sensor is coupled to the controller;

wherein the controller is programmed to control the first heater to stop heating when the temperature of the first electronic component reaches a normal operation temperature.

22. The electronic apparatus as claimed in claim 18, wherein the controller is an embedded controller.

* * * * *